US008352528B2

(12) United States Patent
Mimar

(10) Patent No.: US 8,352,528 B2
(45) Date of Patent: Jan. 8, 2013

(54) APPARATUS FOR EFFICIENT DCT CALCULATIONS IN A SIMD PROGRAMMABLE PROCESSOR

(76) Inventor: Tibet Mimar, Morgan Hill, CA (US)

( * ) Notice: Subject to any disclaimer, the term of this patent is extended or adjusted under 35 U.S.C. 154(b) by 780 days.

(21) Appl. No.: 12/586,357

(22) Filed: Sep. 20, 2009

(65) Prior Publication Data
US 2011/0072065 A1 Mar. 24, 2011

(51) Int. Cl.
G06F 17/14 (2006.01)
(52) U.S. Cl. ........ 708/402; 708/400; 708/401; 708/490; 712/222
(58) Field of Classification Search .................. None
See application file for complete search history.

(56) References Cited

U.S. PATENT DOCUMENTS 5,438,669 A * 8/1995 Nakazawa et al. ............ 712/222
5,812,147 A    9/1998 Van Hook et al.
5,943,502 A    8/1999 Sariel et al.
7,216,140 B1   5/2007 Chen et al.
8,074,058 B2 * 12/2011 Van Hook et al. ............ 712/222
2006/0129787 A1 * 6/2006 Hook et al. ................... 712/222

OTHER PUBLICATIONS

Motion Estimation with Intel® Streaming SIMD Extensions 4 (Intel® SSE4); Submitted by Kiefer Kuah (Intel), Apr. 2007; http://software.intel.com/en-us/articles/motion-estimation-with-intel-streaming-simd-extensions-4-intel-sse4/.*
An 8-Point IDCT Computing Resource Implemented on a TriMedia/CPU64 Reconfigurable Functional Unit, Proceedings of PROGRESS 2001, Veldhoven, The Netherlands, Oct. 18, 2001, pp. 211-218.
High Throughput 2D DCT/IDCT Processor for Video Coding, G.A. Ruiz, et al, 0-7803-9134-9/05, IEEE, 2005, Washington, DC, USA, pp. III-1036-III-1039.
A fast Precise Implementation of 8×8 Discrete Cosine Transform Using the Streaming SIMD Extensions and MMX Instructions, pp. 1-21, Version 1.0, Apr. 1999, Intel, Order No. 742474-001, California, USA.

* cited by examiner

Primary Examiner — Tammara Peyton

(57) ABSTRACT

The present invention relates to a efficient implementation of integer and fractional 8-length or 4-length, or 8×8 or 4×4 DCT in a SIMD processor as part of MPEG and other video compression standards.

13 Claims, 19 Drawing Sheets

| OPCODE 6-Bits | Dest 5-Bits | Source-1 5-Bits | Source-2 5-Bits | Source-3 Element 5-Bits | Format 2-Bits | Condition 4-Bits |

| Format # | Instruction Syntax | | Mode |
|---|---|---|---|
| 0 | <Instruction>.<cond> | VRd, VRs1, VRs2 | Standard |
| | <Instruction>.<cond> | VRd, VRs1, #imm5 | |
| | <Instruction>.<cond> | VRd, VRs1, VRs2, Rn | |
| | <Instruction>.<cond> | VRd, VRs1, VRs2, #imm5 | |
| 1 | <Instruction>.<cond> | VRd, VRs1, VRs2[element] | Broadcast |
| 2 | <Instruction>.<cond> | VRd, VRs1, VRs2, VRs3 | Full Mapping |
| 3 | (Future Expansion) | | (Reserved) |

Notation:
cond: Condition Code Selection;
Imm5: 5-Bit Immediate number
Element: Selects one of the vector elements for broadcast mode
Rn: Scalar processor register

Vector Instruction Format Groups.

Figure 4

| Assembly Syntax | Description |
|---|---|
| LDV    VRd, offset-16 (Rn) | Load all elements of vector register.<br>EA= Rn + (offset-16);<br>VRd ← 16 Elements Starting @ EA;<br>Offset-16 is unsigned address in words. |
| LDV. <M>    VRd [element], offset-6 (Rn) | Load M Elements of vector register.<br>M is the coded load type value: 1, 2, 4, or 8 elements<br>EA = Rn + (offset-6);<br>VRd [element...element + N] ← M Elements @EA;<br>Element is restricted to Modulo M boundaries.<br>Offset-6 is unsigned address in 16-bit words. |
| STV    VRs, offset-16 (Rn) | Store all elements of vector register.<br>EA = Rn + (offset-16); Offset-16 is unsigned in bytes.<br>8 words @ EA ← VRs; |
| STV.M    VRs[element], offset-11 (Rn) | Store M elements of vector register.<br>M is the coded load type value: 1, 2, 4, or 8 elements<br>EA = Rn + (offset-11);<br>Element is restricted to Modulo M boundaries.<br>M words @ EA ← M Elements of VRs; |
| Notes:<br>    1. No vector or scalar condition codes are affected.<br>    2. EA: Effective Address: usually refers to 16-bit words, except for byte operations in which case refers to byte addresses<br>    3. Offsets are specified in terms of 16-bit operands.<br>    4. SE: Sign Extension ||
| Table: Vector Load and Store Instructions (Part of Scalar Processor) ||

Figure 8

| Assembly Syntax | | Description |
|---|---|---|
| VABS[.cond] | VRd, VRs, VRs3 | Absolute Value: |
| VABS[.cond] | VRd, VRs [element] | VACC ← abs (VRs) |
| VABS[.cond] | VRd, VRs | VRd ← Signed-Clamp (VACC) |
| VABSD[.cond] | VRd, VRs1, VRs2, VRs3 | Absolute Difference: |
| VABSD[.cond] | VRd, VRs1, VRs2 [element] | VACC ← abs (VRs1 - VRs2) |
| VABSD[.cond] | VRd, VRs1, VRs2 | VRd ← Signed-Clamp (VACC) |
| VABSDS[.cond] | VRd, VRs1, VRs2, VRs3 | Absolute Difference Scaled: |
| VABSDS[.cond] | VRd, VRs1, VRs2 [element] | VACC ← abs (VRs1 - VRs2)/2 |
| VABSDS[.cond] | VRd, VRs1, VRs2 | VRd ← Signed-Clamp (VACC) |
| VADD[.cond] | VRd, VRs1, VRs2, VRs3 | Addition: |
| VADD[.cond] | VRd, VRs1, VRs2 [element] | VACC ← VRs1 + VRs2 |
| VADD[.cond] | VRd, VRs1, VRs2 | VRd ← Signed-Clamp (VACC) |
| VADDS[.cond] | VRd, VRs1, VRs2, VRs3 | Addition Scaled: |
| VADDS[.cond] | VRd, VRs1, VRs2 [element] | VACC ← (VRs1 + VRs2) / 2 |
| VADDS[.cond] | VRd, VRs1, VRs2 | VRd ← Signed-Clamp (VACC) |
| VINC[.cond] | VRd, VRs, #imm5,VRs3 | Increment by Constant: VACC ← VRs + imm5 |
| VINC[.cond] | VRd, VRs, #imm5 | VRd ← Signed-Clamp (VACC) imm5: 5-bit unsigned number. |
| VMUL[.cond] | VRd, VRs1, VRs2, VRs3 | Multiply: |
| VMUL[.cond] | VRd, VRs1, VRs2 [element] | VACC ← VRs1 * VRs2 |
| VMUL[.cond] | VRd, VRs1, VRs2 | VRd ← Signed-Clamp (VACC) |
| VSUB[.cond] | VRd, VRs1, VRs2, VRs3 | Subtraction: |
| VSUB[.cond] | VRd, VRs1, VRs2 [element] | VACC ← VRs1 - VRs2 |
| VSUB[.cond] | VRd, VRs1, VRs2 | VRd ← Signed-Clamp (VACC) |
| VECTOR ARITHMETIC INSTRUCTIONS | | |

Figure 9

| Assembly Syntax | | Description |
|---|---|---|
| VADDA[.cond] | VRd, VRs1, VRs2, VRs3 | Add-Accumulate: |
| VADDA[.cond] | VRd, VRs1, VRs2 [element] | VACC ← VACC + (VRs1 + VRs2) |
| VADDA[.cond] | VRd, VRs1, VRs2 | VRd ← Signed-Clamp (VCC) |
| VADDSA[.cond] | VRd, VRs1, VRs2, VRs3 | Add-Subtract-From-Accumulator: |
| VADDSA[.cond] | VRd, VRs1, VRs2 [element] | VACC ← VACC - (VRs1 + VRs2) |
| VADDSA[.cond] | VRd, VRs1, VRs2 | VRd ← Signed-Clamp (VCC) |
| VMAC[.cond] | VRd, VRs1, VRs2, VRs3 | Multiply-Accumulate: |
| VMAC[.cond] | VRd, VRs1, VRs2 [element] | VACC ← VACC + (VRs1 * VRs2) |
| VMAC[.cond] | VRd, VRs1, VRs2 | VRd ← Signed-Clamp (VCC) |
| VMAS[.cond] | VRd, VRs1, VRs2, VRs3 | Multiply-Subtract-Accumulate: |
| VMAS[.cond] | VRd, VRs1, VRs2 [element] | VACC ← VACC - (VRs1 * VRs2) |
| VMAS[.cond] | VRd, VRs1, VRs2 | VRd ← Signed-Clamp (VCC) |
| VSUBA[.cond] | VRd, VRs1, VRs2, VRs3 | Subtract-Accumulate: |
| VSUBA[.cond] | VRd, VRs1, VRs2 [element] | VACC ← VACC + (VRs1 - VRs2) |
| VSUBA[.cond] | VRd, VRs1, VRs2 | VRd ← Signed-Clamp (VCC) |
| VSUBSA[.cond] | VRd, VRs1, VRs2, VRs3 | Subtract- Subtract-From-Accumulator: |
| VSUBSA[.cond] | VRd, VRs1, VRs2 [element] | VACC ← VACC - (VRs1 - VRs2) |
| VSUBSA[.cond] | VRd, VRs1, VRs2 | VRd ← Signed-Clamp (VCC) |
| Table: Vector Accumulate Arithmetic Instructions | | |

Figure 10

$$\begin{pmatrix} y(1) \\ \ldots \\ y(n) \end{pmatrix} = T \begin{pmatrix} x(1) \\ \ldots \\ x(n) \end{pmatrix}$$

$$T = \begin{pmatrix} 0.3536 & 0.3536 & 0.3536 & 0.3536 & 0.3536 & 0.3536 & 0.3536 & 0.3536 \\ 0.4904 & 0.4157 & 0.2778 & 0.0975 & -0.0975 & -0.2778 & -0.4157 & -0.4904 \\ 0.4619 & 0.1913 & -0.1913 & -0.4619 & -0.4619 & -0.1913 & 0.1913 & 0.4619 \\ 0.4157 & -0.0975 & -0.4904 & -0.2778 & 0.2778 & 0.4904 & 0.0975 & -0.4157 \\ 0.3536 & -0.3536 & -0.3536 & 0.3536 & 0.3536 & -0.3536 & -0.3536 & 0.3536 \\ 0.2778 & -0.4904 & 0.0975 & 0.4157 & -0.4157 & -0.0975 & 0.4904 & -0.2778 \\ 0.1913 & -0.4619 & 0.4619 & -0.1913 & -0.1913 & 0.4619 & -0.4619 & 0.1913 \\ 0.0975 & -0.2778 & 0.4157 & -0.4904 & 0.4904 & -0.4157 & 0.2778 & -0.0975 \end{pmatrix}$$

Figure 11

| | | | | |
|---|---|---|---|---|
| z[0] = x[0] * C0[0] | + x[2] * C1[0] | + x[4] * C2[0] | + x[6] * C3[0]; | |
| z[1] = x[0] * C0[1] | + x[2] * C1[1] | + x[4] * C2[1] | + x[6] * C3[1]; | |
| z[2] = x[0] * C0[2] | + x[2] * C1[2] | + x[4] * C2[2] | + x[6] * C3[2]; | |
| z[3] = x[0] * C0[3] | + x[2] * C1[3] | + x[4] * C2[3] | + x[6] * C3[3]; | 8-Wide iDCT — 600 |
| z[4] = x[1] * C0[4] | + x[3] * C1[4] | + x[5] * C2[4] | + x[7] * C3[4]; | |
| z[5] = x[1] * C0[5] | + x[3] * C1[5] | + x[5] * C2[5] | + x[7] * C3[5]; | |
| z[6] = x[1] * C0[6] | + x[3] * C1[6] | + x[5] * C2[6] | + x[7] * C3[6]; | |
| z[7] = x[1] * C0[7] | + x[3] * C1[7] | + x[5] * C2[7] | + x[7] * C3[7]; | |
| z[8] = x[8] * C0[0] | + x[10] * C1[0] | + x[12] * C2[0] | + x[14] * C3[0]; | |
| z[9] = x[8] * C0[1] | + x[10] * C1[1] | + x[12] * C2[1] | + x[14] * C3[1]; | |
| z[10] = x[8] * C0[2] | + x[10] * C1[2] | + x[12] * C2[2] | + x[14] * C3[2]; | |
| z[11] = x[8] * C0[3] | + x[10] * C1[3] | + x[12] * C2[3] | + x[14] * C3[3]; | 8-Wide iDCT — 610 |
| z[12] = x[9] * C0[4] | + x[11] * C1[4] | + x[13] * C2[4] | + x[14] * C3[4]; | |
| z[13] = x[9] * C0[5] | + x[11] * C1[5] | + x[13] * C2[5] | + x[14] * C3[5]; | |
| z[14] = x[9] * C0[6] | + x[11] * C1[6] | + x[13] * C2[6] | + x[14] * C3[6]; | |
| z[15] = x[9] * C0[7] | + x[11] * C1[7] | + x[13] * C2[7] | + x[14] * C3[7]; | |
| STAGE 1 | STAGE 2 | STAGE 3 | STAGE 4 | |

STAGE 1: VMUL  VR0, VR1, VR12, VR8;
STAGE 2: VMAC  VR0, VR1, VR12, VR9;
STAGE 3: VMAC  VR0, VR1, VR13, VR10;
STAGE 4: VMAC  VR0, VR1, VR13, VR11;

620 — 8-Wide iDCT
y[0] = z[0] + z[4];
y[1] = z[1] + z[5];
y[2] = z[2] + z[6];
y[3] = z[3] + z[7];
y[4] = z[3] - z[7];
y[5] = z[2] - z[6];
y[6] = z[1] - z[5];
y[7] = z[0] - z[4];

630 — 8-Wide iDCT
y[8]  = z[8]  + z[12];
y[9]  = z[9]  + z[13];
y[10] = z[10] + z[14];
y[11] = z[11] + z[15];
y[12] = z[11] - z[15];
y[13] = z[10] - z[14];
y[14] = z[9]  - z[13];
y[15] = z[8]  - z[12];

STAGE 5

VR16 VECTOR REGISTER FIELDS

| Element # | MASK | OP | SEL #1 | SEL #2 |
|---|---|---|---|---|
| 0 | | ADD | 0 | 4 |
| 1 | | ADD | 1 | 5 |
| 2 | | ADD | 2 | 6 |
| 3 | | ADD | 3 | 7 |
| 4 | | SUB | 3 | 7 |
| 5 | | SUB | 2 | 6 |
| 6 | | SUB | 1 | 5 |
| 7 | NOT SET | SUB | 0 | 4 |
| 8 | | ADD | 8 | 12 |
| 9 | | ADD | 9 | 13 |
| 10 | | ADD | 10 | 14 |
| 11 | | ADD | 11 | 15 |
| 12 | | SUB | 11 | 15 |
| 13 | | SUB | 10 | 14 |
| 14 | | SUB | 9 | 13 |
| 15 | | SUB | 8 | 12 |

VR8 VECTOR REGISTER FIELDS

| Element # | MASK | OP | SEL #1 | SEL #2 |
|---|---|---|---|---|
| 0 | | | 0 | 0 |
| 1 | | | 0 | 1 |
| 2 | | | 0 | 2 |
| 3 | | | 0 | 3 |
| 4 | | | 1 | 4 |
| 5 | | | 1 | 5 |
| 6 | SET | DEFAULT | 1 | 6 |
| 7 | | | 1 | 7 |
| 8 | | | 8 | 0 |
| 9 | | | 8 | 1 |
| 10 | | | 8 | 2 |
| 11 | | | 8 | 3 |
| 12 | | | 9 | 4 |
| 13 | | | 9 | 5 |
| 14 | | | 9 | 6 |
| 15 | | | 9 | 7 |

STAGE 5: VADD   VR2, VR0, VR0, VR16;

Figure 12

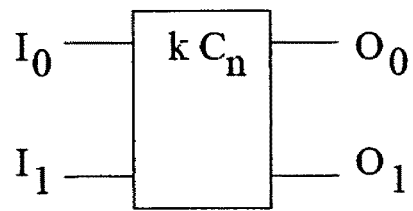
$$O_0 = I_0 k \cos \frac{n\pi}{16} - I_1 k \sin \frac{n\pi}{16} = C'_n I_0 - S'_n I_1$$
$$O_1 = I_0 k \sin \frac{n\pi}{16} + I_1 k \cos \frac{n\pi}{16} = S'_n I_0 + C'_n I_1$$
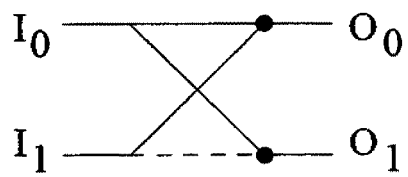
$$O_0 = I_0 + I_1$$
$$O_1 = I_0 - I_1$$
Figure 15

|     | 100 |     |     |     |     |     |     |     |
| --- | --- | --- | --- | --- | --- | --- | --- | --- |
|     | 0   | 1   | 2   | 3   | 4   | 5   | 6   | 7   |
| VR0 | X(0,0) | X(0,1) | X(0,2) | X(0,3) | X(0,4) | X(0,5) | X(0,6) | X(0,7) |
|     | 8   | 9   | 10  | 11  | 12  | 13  | 14  | 15  |
|     | X(1,0) | X(1,1) | X(1,2) | X(1,3) | X(1,4) | X(1,5) | X(1,6) | X(1,7) |

|     | 0   | 1   | 2   | 3   | 4   | 5   | 6   | 7   |
| --- | --- | --- | --- | --- | --- | --- | --- | --- |
| VR1 | X(2,0) | X(2,1) | X(2,2) | X(2,3) | X(2,4) | X(2,5) | X(2,6) | X(2,7) |
|     | 8   | 9   | 10  | 11  | 12  | 13  | 14  | 15  |
|     | X(3,0) | X(3,1) | X(3,2) | X(3,3) | X(3,4) | X(3,5) | X(3,6) | X(3,7) |

|     | 0   | 1   | 2   | 3   | 4   | 5   | 6   | 7   |
| --- | --- | --- | --- | --- | --- | --- | --- | --- |
| VR2 | X(4,0) | X(4,1) | X(4,2) | X(4,3) | X(4,4) | X(4,5) | X(4,6) | X(4,7) |
|     | 8   | 9   | 10  | 11  | 12  | 13  | 14  | 15  |
|     | X(5,0) | X(5,1) | X(5,2) | X(5,3) | X(5,4) | X(5,5) | X(5,6) | X(5,7) |

|     | 0   | 1   | 2   | 3   | 4   | 5   | 6   | 7   |
| --- | --- | --- | --- | --- | --- | --- | --- | --- |
| VR3 | X(6,0) | X(6,1) | X(6,2) | X(6,3) | X(6,4) | X(6,5) | X(6,6) | X(6,7) |
|     | 8   | 9   | 10  | 11  | 12  | 13  | 14  | 15  |
|     | X(7,0) | X(7,1) | X(7,2) | X(7,3) | X(7.4) | X(7,5) | X(7,6) | X(7,7) |

Figure 17

| | 0 | 1 | 2 | 3 |
|---|---|---|---|---|
| VR0 | d(0,0) | d(0,1) | d(0,2) | d(0,3) |
| | 4 | 5 | 6 | 7 |
| | d(1,0) | d(1,1) | d(1,2) | d(1,3) |
| | 8 | 9 | 10 | 11 |
| | d(2,0) | d(2,1) | d(2,2) | d(2,3) |
| | 12 | 13 | 14 | 15 |
| | d(3,0) | d(3,1) | d(3,2) | d(3,3) |

Figure 18

STAGE 1: VADD  VR1, VR0, VR0, VR8;
STAGE 2: VADD  VR2, VR1, VR1, VR9;
STAGE 3: VADD  VR3, VR2, VR2, VR10;
STAGE 4: VADD  VR4, VR3, VR3, VR11;

| Element # | MASK | OP | SEL #1 | >>1 #1 | SEL #2 | >>1 #2 |
|---|---|---|---|---|---|---|
| 0 | 0 | ADD | 0 | 0 | 2 | 0 |
| 1 | 0 | SUB | 0 | 0 | 2 | 0 |
| 2 | 0 | SUB | 1 | 1 | 3 | 0 |
| 3 | 0 | ADD | 1 | 0 | 3 | 1 |
| 4 | 0 | ADD | 0 | 0 | 2 | 0 |
| 5 | 0 | SUB | 0 | 0 | 2 | 0 |
| 6 | 0 | SUB | 1 | 1 | 3 | 0 |
| 7 | 0 | ADD | 1 | 0 | 3 | 1 |
| 8 | 0 | ADD | 0 | 0 | 2 | 0 |
| 9 | 0 | SUB | 0 | 0 | 2 | 0 |
| 10 | 0 | SUB | 1 | 1 | 3 | 0 |
| 11 | 0 | ADD | 1 | 0 | 3 | 1 |
| 12 | 0 | ADD | 0 | 0 | 2 | 0 |
| 13 | 0 | SUB | 0 | 0 | 2 | 0 |
| 14 | 0 | SUB | 1 | 1 | 3 | 0 |
| 15 | 0 | ADD | 1 | 0 | 3 | 1 |

VR8 VECTOR REGISTER FIELDS — STAGE 1

| Element # | MASK | OP | SEL #1 | >>1 #1 | SEL #2 | >>1 #2 |
|---|---|---|---|---|---|---|
| 0 | 0 | ADD | 0 | 0 | 3 | 0 |
| 1 | 0 | ADD | 1 | 0 | 2 | 0 |
| 2 | 0 | SUB | 1 | 0 | 2 | 0 |
| 3 | 0 | SUB | 0 | 0 | 3 | 0 |
| 4 | 0 | ADD | 0 | 0 | 3 | 0 |
| 5 | 0 | ADD | 1 | 0 | 2 | 0 |
| 6 | 0 | SUB | 1 | 0 | 2 | 0 |
| 7 | 0 | SUB | 0 | 0 | 3 | 0 |
| 8 | 0 | ADD | 0 | 0 | 3 | 0 |
| 9 | 0 | ADD | 1 | 0 | 2 | 0 |
| 10 | 0 | SUB | 1 | 0 | 2 | 0 |
| 11 | 0 | SUB | 0 | 0 | 3 | 0 |
| 12 | 0 | ADD | 0 | 0 | 3 | 0 |
| 13 | 0 | ADD | 1 | 0 | 2 | 0 |
| 14 | 0 | SUB | 1 | 0 | 2 | 0 |
| 15 | 0 | SUB | 06 | 0 | 3 | 0 |

VR9 VECTOR REGISTER FIELDS — STAGE 2

| Element # | MASK | OP | SEL #1 | >>1 #1 | SEL #2 | >>1 #2 |
|---|---|---|---|---|---|---|
| 0 | 0 | ADD | 0 | 0 | 8 | 0 |
| 1 | 0 | ADD | 1 | 0 | 9 | 0 |
| 2 | 0 | ADD | 2 | 0 | 10 | 0 |
| 3 | 0 | ADD | 3 | 0 | 11 | 0 |
| 4 | 0 | SUB | 0 | 0 | 8 | 0 |
| 5 | 0 | SUB | 1 | 0 | 9 | 0 |
| 6 | 0 | SUB | 2 | 0 | 10 | 0 |
| 7 | 0 | SUB | 3 | 0 | 11 | 0 |
| 8 | 0 | SUB | 4 | 1 | 12 | 0 |
| 9 | 0 | SUB | 5 | 1 | 13 | 0 |
| 10 | 0 | SUB | 6 | 1 | 14 | 0 |
| 11 | 0 | SUB | 7 | 1 | 15 | 0 |
| 12 | 0 | ADD | 4 | 0 | 12 | 1 |
| 13 | 0 | ADD | 5 | 0 | 13 | 1 |
| 14 | 0 | ADD | 6 | 0 | 14 | 1 |
| 15 | 0 | ADD | 7 | 0 | 15 | 1 |

VR10 VECTOR REGISTER FIELDS — STAGE 3

| Element # | MASK | OP | SEL #1 | >>1 #1 | SEL #2 | >>1 #2 |
|---|---|---|---|---|---|---|
| 0 | 0 | ADD | 0 | 0 | 12 | 0 |
| 1 | 0 | ADD | 1 | 0 | 13 | 0 |
| 2 | 0 | ADD | 2 | 0 | 14 | 0 |
| 3 | 0 | ADD | 3 | 0 | 15 | 0 |
| 4 | 0 | ADD | 4 | 0 | 8 | 0 |
| 5 | 0 | ADD | 5 | 0 | 9 | 0 |
| 6 | 0 | ADD | 6 | 0 | 10 | 0 |
| 7 | 0 | ADD | 7 | 0 | 12 | 0 |
| 8 | 0 | SUB | 4 | 0 | 8 | 0 |
| 9 | 0 | SUB | 5 | 0 | 9 | 0 |
| 10 | 0 | SUB | 6 | 0 | 10 | 0 |
| 11 | 0 | SUB | 7 | 0 | 11 | 0 |
| 12 | 0 | SUB | 0 | 0 | 12 | 0 |
| 13 | 0 | SUB | 1 | 0 | 13 | 0 |
| 14 | 0 | SUB | 2 | 0 | 14 | 0 |
| 15 | 0 | SUB | 3 | 0 | 15 | 0 |

VR11 VECTOR REGISTER FIELDS — STAGE 4

Figure 19

APPARATUS FOR EFFICIENT DCT CALCULATIONS IN A SIMD PROGRAMMABLE PROCESSOR

BACKGROUND OF THE INVENTION

1. Field of the Invention

The invention relates generally to the field of processor chips and specifically to the field of single-instruction multiple-data (SIMD) processors. More particularly, the present invention relates to efficient calculation of Discrete-Cosine Transform (DCT) operations in a SIMD processor.

2. Description of the Background Art

DCT is used by all video compression standards, including JPEG, MPEG-2, MPEG-4.2, MPEG-4.10 (also known as H.264), VC-1, RealVideo by Real Media, DivX, etc. As such, it is used by all DVDs, and in all terrestrial, cable and satellite TV broadcast systems. DCT processing is also used in Personal Video Recorders (PVRs), mobile audio-video streaming, security applications, video phone and video conferencing applications. DCT is usually implemented as a hardware block dedicated to perform DCT functionality on System-on-Chip (SoC) that performs video compression and other functionality for TVs, set top boxes, DVD players, etc. However, as further video standards are developed different types and variations of DCT are required. For example, MPEG-2 uses 8×8 DCT using fractional arithmetic, but new video compression standard H.264 requires 4×4 or 8×8 integer DCTs to be performed according to the new standard. This requires new hardware blocks to be added as existing programmable methods are too slow, and existing DCT blocks are difficult to change because the operation of 4×4 integer DCT and 8×8 fractional DCT are significantly different. Also, dedicated hardware blocks have the disadvantage that they require date to be send from a programmable processor to such a dedicated function block, waiting for latency and then transferring data back to processor memory. Usually such operations are dominated by transfer and latency clock cycles. Transferring 64 elements of a 8×8 would require 64 clock cycles by itself, not counting latency for hardware pipeline calculations and transfer of output data. Furthermore, as we transition from standard definition to full-definition with 1080P resolution the performance requirements for video compression data processing go up by a factor of 6×.

Existing SIMD processor architectures do not support efficient implementation of DCT by the processor. For example, Pentium processor supports SIMD extensions of MMX (Multi-Media Extension), SSE (Streaming SIMD Extension), and SSE2 to accelerate data-crunching intensive applications such as DCT. SSE provides parallelism by a factor of four (64-bits wide), and SSE2 provides parallelism by a factor of eight (128-bit wide). Video decoders only performs inverse DCT (also referred to as iDCT), and video compression encoders perform both forward and inverse DCT operations.

Intel shows that 8×8 iDCT requires 320 MMX clock cycles and 290 SSE clock cycles (AP-922 Streaming SIMD Extensions—A Fast Precise 8xx DCT, 4/99, Version 1). However, it is also shown that (Intel AP-945 Using SSE2 to Implement an Inverse Discrete Cosine Transform—Performance Data) the SSE2 instructions are 1.31 times faster the SSE instructions when both implementations are executed on a Pentium 4 processor. This shows diminishing returns on increased parallelism due to architectural limitations, since SSE2 should be twice as fast due to x2 parallelism in comparison to the SSE.

Implementing the 4×4 integer DCT puts further strains on the Intel processor. Performance analysis by Kerry Widder (Efficient Implementation of H.264 Transform Operations Using Sub word Parallel Architecture) shows that for the reference video sequence of Girl.264, IDCT requires 4.95% of total processing time, and IDCT 4×4 requires 17% percent of total processing according to the performance profiling. The effect of more complex processing of H.264 (by about a factor of 3-5×) combined with additional performance requirements due to full HD displays of 1080P (about a factor of 6×) results in not being able to perform video encode or decode using H.264 even if we dedicate the whole Pentium processor for this purpose. This would also be an expensive solution for consumer TV, set top box and other applications.

AltiVec SIMD provides an 8-wide SIMD and is part of PowerPC processors, which requires about 102 clock cycles including the function call overhead (Freescale AltiVec Application Note, AltiVec 2D Inverse Discrete Cosine Transform Application Note and Code Examples, 2002).

TriMedia-CPU64 is a 64-bit 5 issue-slot VLIW core, launching a long instruction every clock cycle (An 8-Point IDCT Computing Resource Implemented on a TriMedia/CPU64 Reconfigurable Functional Unit, Proceedings of PROGRESS 2001, Veldhoven, The Netherlands, Oct. 18, 2001, pp. 211-218). This paper discusses an augmenting a general purpose processor with a reconfigurable core, which exploits both the general purpose processor capability and FPGA flexibility to implement application-specific computations. The conclusion of this work is that 8-point IDCT can be computed in 16 TriMedia cycles.

Texas Instruments TMS320C64x DSPs are high-performance fixed-point DSP generation in the TMS320C6000 DSP platform, and it features a 8-issue very-long-instruction word (VLIW) architecture. The C64x DSP core processor has eight independent functional units—2 multipliers and 6 arithmetic logic units. The C64x can produce four 32-bit multiply-accumulates (MACs) per cycle. IDCT of 8×8 is performed in 135 clock cycles.

Today's SIMD processor performs vector operations between respective elements of two source vectors. For example, vector-add instruction for a 4-wide SIMD will add respective elements of source #1 and source #2 together, i.e., element #0 of both sources are together and added, element #1 of both sources are paired together and added, and so forth. Alternatively, one of the source vector elements of one first source vector is paired with across all elements of a second source vector. This is referred to as the broadcast mode. DCT operations, however, requires arbitrary pairing of one or two source vector elements. Also, some DCT operations require a different operation to be performed for each vector element position.

SUMMARY OF THE INVENTION

The invention provides a method for implementing DCT operations more efficiently in a SIMD processor. 8-length DCT is performed in three clock cycles, and 8×8 DCT is implemented in 41 clock cycles. The 4×4 integer DCT is implemented in 4 clock cycles. Adding ability to map both source vector elements, and ability to perform different operations for each vector element in conjunction with a dual-issue processor where vector load/store operations are performed in parallel with SIMD vector operations provide a mechanism to implement all types of DCT operations significantly more efficiently in comparison to both existing hardware and software solutions.

BRIEF DESCRIPTION OF DRAWINGS

The accompanying drawings, which are incorporated and form a part of this specification, illustrate prior art and embodiments of the invention, and together with the description, serve to explain the principles of the invention.

FIG. 4 shows different supported SIMD instruction formats.

FIG. 8 shows an example of vector load and store instructions that are executed as part of scalar processor.

FIG. 9 shows an example of vector arithmetic instructions.

FIG. 10 shows an example of vector-accumulate instructions.

FIG. 11 shows the matrix multiplication for an 8-length DCT or IDCT calculation.

FIG. 12 shows implementation of 8-length 1-dimensional (1-D) inverse DCT.

FIG. 15 shows the details of "butterflies" and boxes of "Leoffler" algorithm.

FIG. 17 shows the storage of 8×8 in four vector registers prior to DCT operation on columns of 8×8 array.

FIG. 18 shows the format of 4×4 data array in a vector register prior to 4×4 DCT operation.

FIG. 19 shows the details of 4×4 integer DCT operation.

DETAILED DESCRIPTION

Figure 1:
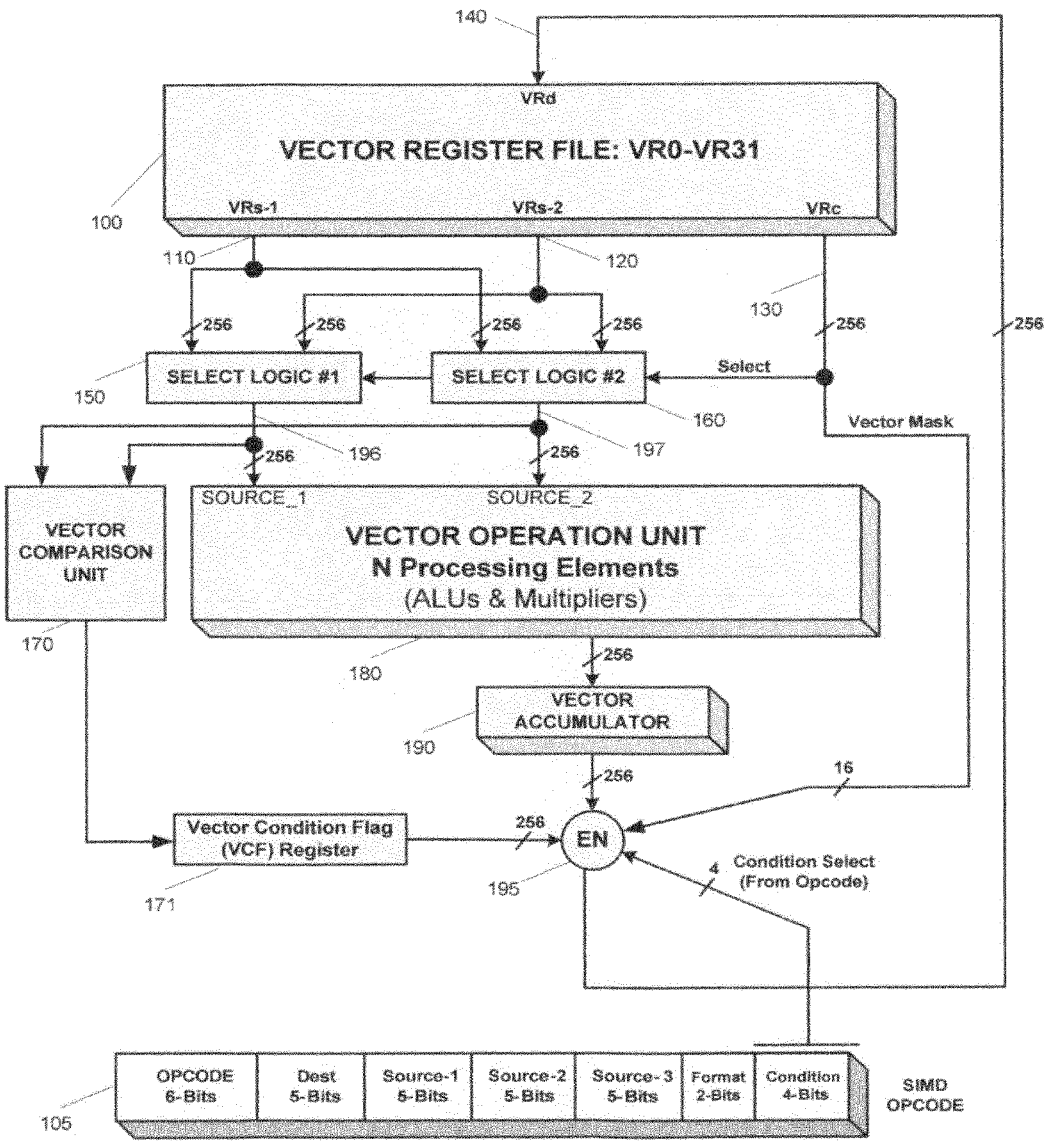
FIG. 1 shows detailed block diagram of the SIMD processor.

The SIMD unit consists of a vector register file 100 and a vector operation unit 180, as shown in FIG. 1. The vector operation unit 180 is comprised of plurality of processing elements, where each processing element is comprised of ALU and multiplier. Each processing element has a respective 48-bit wide accumulator register for holding the exact results of multiply, accumulate, and multiply-accumulate operations. These plurality of accumulators for each processing element form a vector accumulator 190. The SIMD unit uses a load-store model, i.e., all vector operations uses operands sourced from vector registers, and the results of these operations are stored back to the register file. For example, the instruction "VMUL VR4, VR0, VR31" multiplies sixteen pairs of corresponding elements from vector registers VR0 and VR31, and stores the results into vector register VR4. The results of the multiplication for each element results in a 32-bit result, which is stored into the accumulator for that element position. Then this 32-bit result for element is clamped and mapped to 16-bits before storing into elements of destination register.

Vector register file has three read ports to read three source vectors in parallel and substantially at the same time. The output of two source vectors that are read from ports VRs-1 110 and from port VRs-2 120 are connected to select logic 150 and 160, respectively. These select logic map two source vectors such that any element of two source vectors could be paired with any element of said two source vectors for vector operations and vector comparison unit inputs 170. The mapping is controlled by a third source vector VRc 130. For example, for vector element position #4 we could pair element #0 of source vector #1 that is read from the vector register file with element #15 of source vector #2 that is read from VRs-2 port of the vector register file. As a second example, we could pair element #0 of source vector #1 with element #2 of source vector #1. The output of these select logic represents paired vector elements, which are connected to SOURCE_1 196 and SOURCE_2 197 inputs of vector operation unit 180 for dyadic vector operations.

The output of vector accumulator is conditionally stored back to the vector register files in accordance with a vector mask from the vector control register elements VRc 130 and vector condition flags from the vector condition flag register VCF 171. The enable logic of 195 controls writing of output to the vector register file.

Vector opcode 105 for SIMD has 32 bits that is comprised of 6-bit opcode, 5-bit fields to select for each of the three source vectors, source-1, source-2, and source-3, 5-bit field to select one of the 32-vector registers as a destination, condition code field, and format field. Each SIMD instruction is conditional, and can select one of the 16 possible condition flags for each vector element position of VCF 171 based on condition field of the opcode 105.

Figure 2:
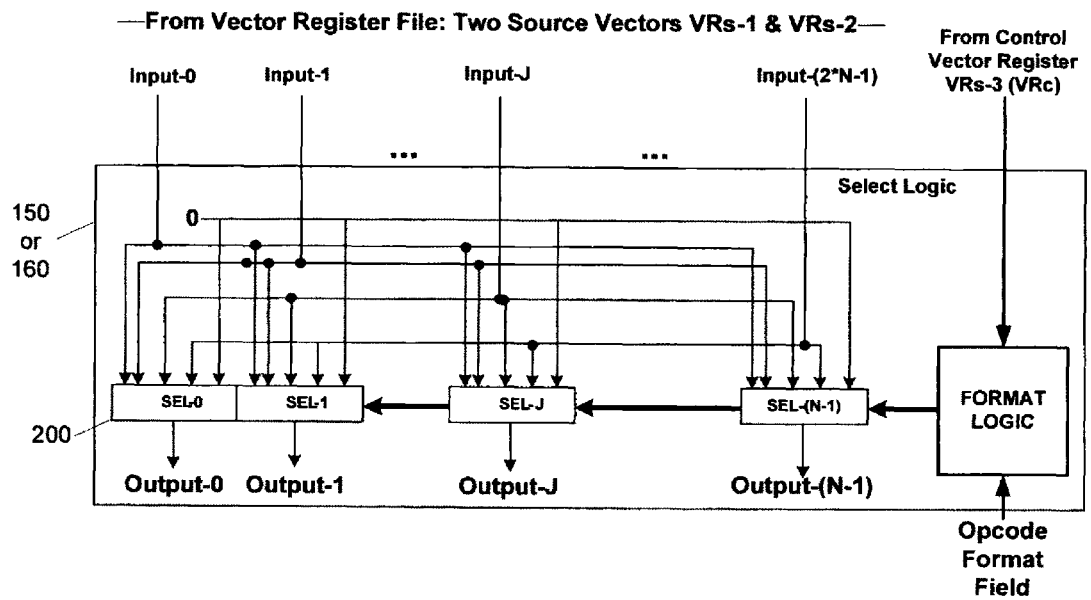
FIG. 2 shows details of the select logic and mapping of source vector elements.

The details of the select logic 150 or 160 is shown in FIG. 2. Each select logic for a given vector element could select any one of the input source vector elements or a value of zero. Thus, select logic units 150 and 160 constitute means for selecting and pairing any element of first and second input vector register with any element of first and second input vector register as inputs to operators for each vector element position in dependence on control register values for respective vector elements.

The select logic comprises of N select circuits, where N represents the number of elements of a vector for N-wide SIMD. Each of the select circuit 200 could select any one of the elements of two source vector elements or a zero. Zero selection is determined by a zero bit for each corresponding element from the control vector register. The format logic chooses one of the three possible instruction formats: element-to-element mode (prior art mode) that pairs respective elements of two source vectors for vector operations, Element "K" broadcast mode (prior art mode), and any-element-to-any-element mode including intra elements (meanings both paired elements could be selected from the same source vector).

Figure 3:
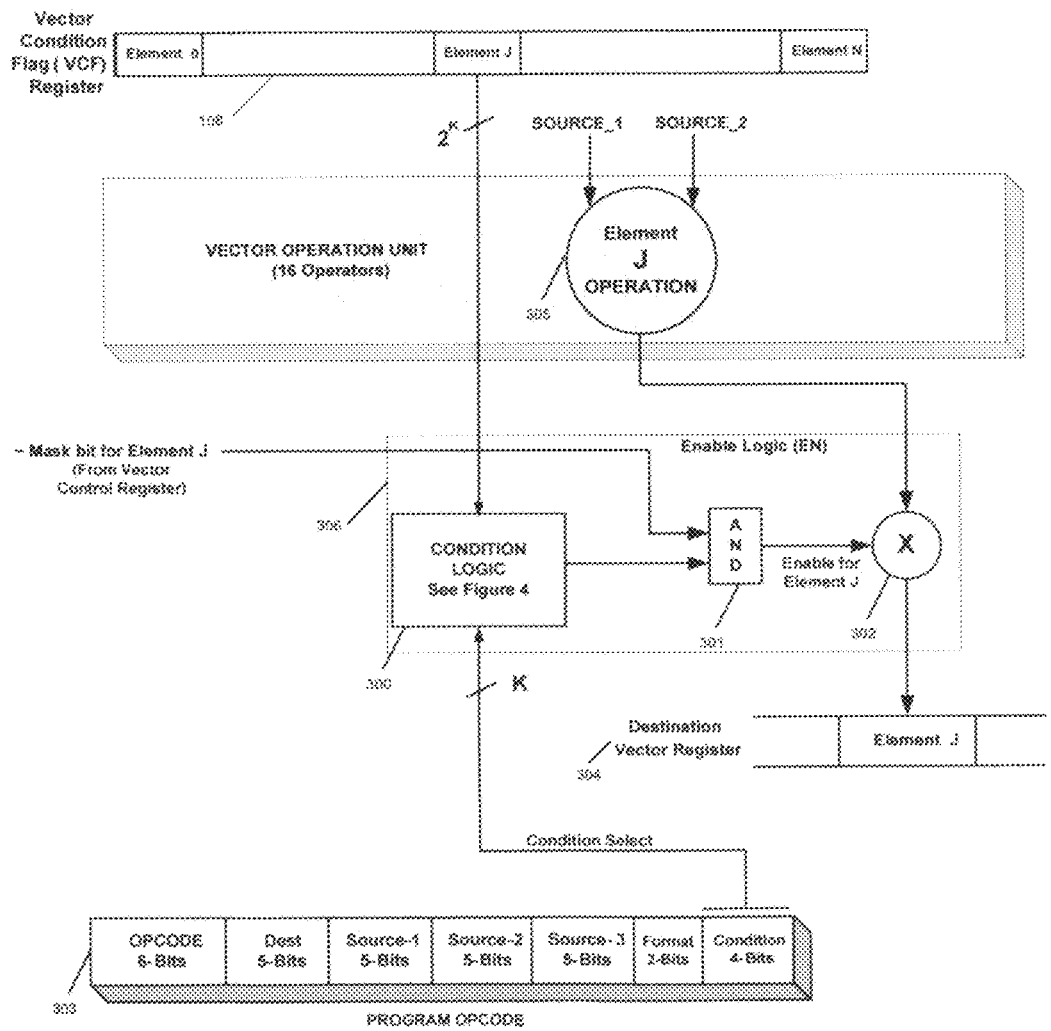
FIG. 3 shows the details of enable logic and the use of vector-condition-flag register.

FIG. 3 shows the operation of conditional operation based on condition flags in VCF from a prior instruction sequence and mask bit from vector control register. The enable logic of 306 comprises Condition Logic 300 to select one of the 16 condition flags for each vector element position of VCF, AND logic 301 to combine condition logic output and mask, and as a result to enable or disable writing of vector operation unit into destination vector register 304 of vector register file.

In one preferred embodiment, each vector element is 16-bits and there are 16 elements in each vector. The control bit fields of control vector register is defined as follows:

Bits 4-0: Select source element from S2∥S-1 elements concatenated;
Bits 9-5: Select source element from S1∥S-2 elements concatenated;
Bit 10: 1→Negate sign of mapped source #2; 0→No change.
Bit 11: 1→Negate sign of accumulator input; 0→No change.

Bit 12: Shift Down mapped Source_1 before operation by one bit.
Bit 13: Shift Down mapped Source_2 before operation by one bit.
Bit 14: Select Source_2 as zero.
Bit 15: Mask bit, when set to a value of one, it disables writing output for that element.

| Bits 4-0 | Element Selection |
|---|---|
| 0 | VRs-1[0] |
| 1 | VRs-1[1] |
| 2 | VRs-1[2] |
| 3 | VRs-1[3] |
| 4 | VRs-1[4] |
| ... | ... |
| 15 | VRs-1[15] |
| 16 | VRs-2[0] |
| 17 | VRs-2[1] |
| 18 | VRs-2[2] |
| 19 | VRs-2[3] |
| ... | ... |
| 31 | VRs-2[15] |

| Bits 9-5 | Element Selection |
|---|---|
| 0 | VRs-2[0] |
| 1 | VRs-2[1] |
| 2 | VRs-2[2] |
| 3 | VRs-2[3] |
| 4 | VRs-2[4] |
| ... | ... |
| 15 | VRs-2[15] |
| 16 | VRs-1[0] |
| 17 | VRs-1[1] |
| 18 | VRs-1[2] |
| 19 | VRs-1[3] |
| ... | ... |
| 31 | VRs-1[15] |

There are three vector processor instruction formats in general as shown in FIG. 4, although this may not apply to every instruction. Format field of opcode selects one of these three SIMD instruction formats. Most frequently used ones are:

| | |
|---|---|
| <Vector Instruction>.<cond> | VRd, VRs-1, VRs-2 |
| <Vector Instruction>.<cond> | VRd, VRs-1, VRs-2 [element] |
| <Vector Instruction>.<cond> | VRd, VRs-1, VRs-2, VRs-3 |

The first form (format=0) uses operations by pairing respective elements of VRs-1 and VRs-2. This form eliminates the overhead to always specify a control vector register. The second form (format=1) with element is the broadcast mode where a selected element of one vector instruction operates across all elements of the second source vector register. The form with VRs-3 is the general vector mapping mode form, where any two elements of two source vector registers could be paired. The word "mapping" in mathematics means "A rule of correspondence established between sets that associates each element of a set with an element in the same or another set". The word mapping herein is used to mean establishing an association between a said vector element position and a source vector element and routing the associated source vector element to said vector element position.

The present invention provides signed negation of second source vector after mapping operation on a vector element-by-element basis in accordance with vector control register. This method uses existing hardware, because each vector position already contains a general processing element that performs arithmetic and logical operations. The advantage of this is in implementing mixed operations where certain elements are added and others are multiplied, for example, as in a fast DCT implementation.

Figure 5:
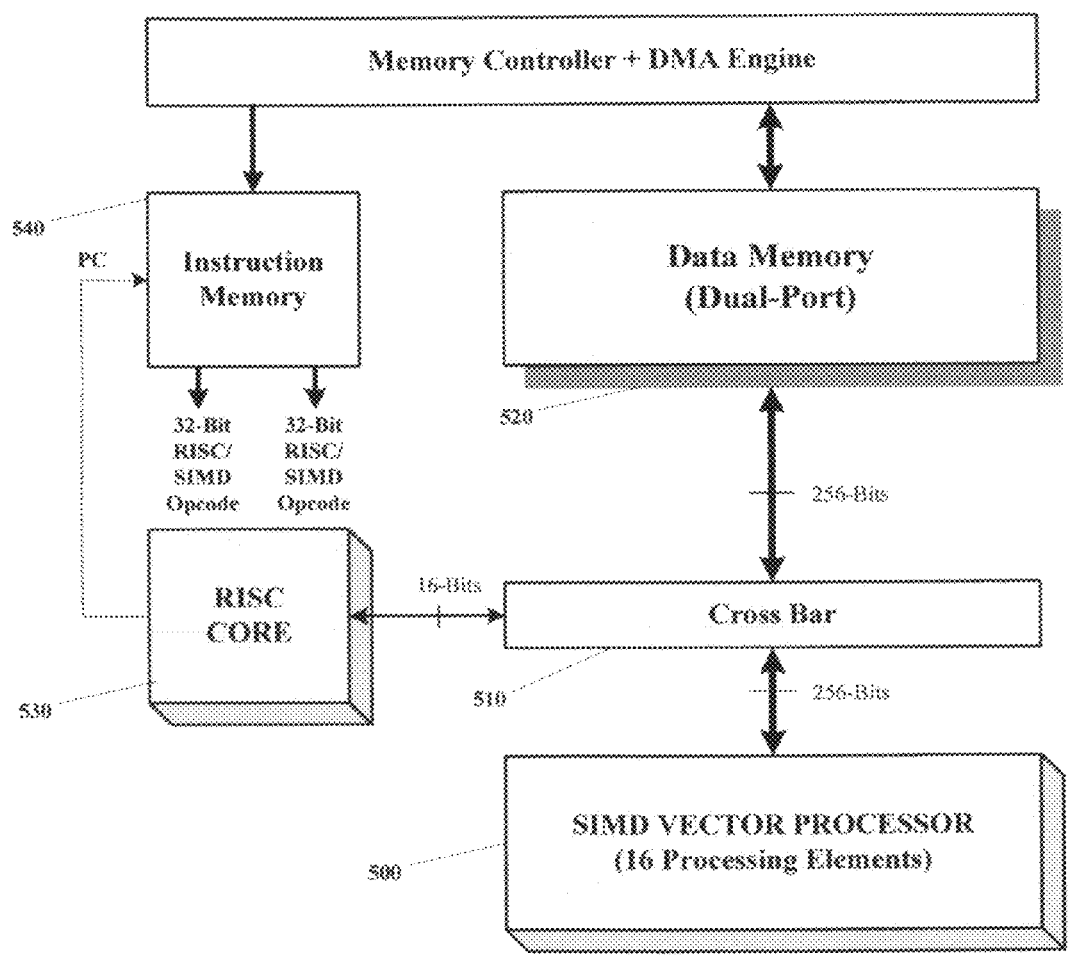
FIG. 5 shows block diagram of dual-issue processor consisting of a RISC processor and SIMD processor.

In one embodiment a RISC processor is used together with the SIMD processor as a dual-issue processor, as shown in FIG. 5. The function of this RISC processor is the load and store of vector registers for SIMD processor, basic address-arithmetic and program flow control. The overall architecture could be considered a combination of Long Instruction Word (LIW) and Single Instruction Multiple Data Stream (SIMD). This is because it issues two instructions every clock cycle, one RISC instruction and one SIMD instruction. SIMD processor can have any number of processing elements. RISC instruction is scalar working on a 16-bit or 32-bit data unit, and SIMD processor is a vector unit working on 16 16-bit data units in parallel.

The data memory in this preferred embodiment is 256-bits wide to support 16 wide SIMD operations. The scalar RISC and the vector unit share the data memory. A cross bar is used to handle memory alignment transparent to the software, and also to select a portion of memory to access by RISC processor. The data memory is dual-port SRAM that is concurrently accessed by the SIMD processor and DMA engine. The data memory is also used to store constants and history information as well input as input and output video data. This data memory is shared between the RISC and SIMD processor.

While the DMA engine is transferring the processed data block out or bringing in the next 2-D block of video data, the vector processor concurrently processes the other data memory module contents. Successively, small 2-D blocks of video frame such as 64 by 64 pixels are DMA transferred, where these blocks could be overlapping on the input for processes that require neighborhood data such as 2-D convolution.

Figure 6:
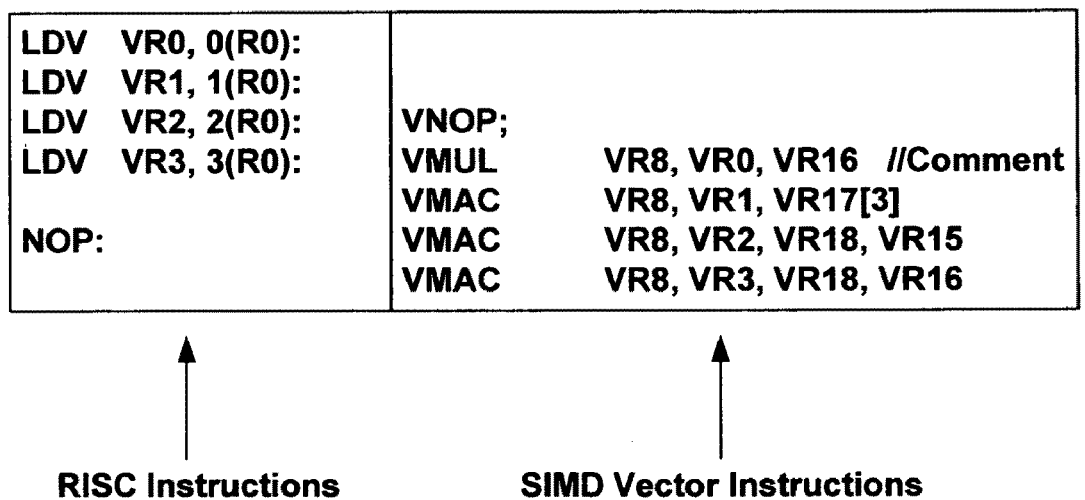
FIG. 6 illustrates executing dual-instructions for RISC and SIMD processors.

SIMD vector processor simply performs data processing, i.e., it has no program flow control instructions. RISC scalar processor is used for all program flow control. RISC processor also additional instructions to load and store vector registers. Each instruction word is 64 bits wide, and typically contains one scalar and one vector instruction. The scalar instruction is executed by the RISC processor, and vector instruction is executed by the SIMD vector processor. In assembly code, one scalar instruction and one vector instruction are written together on one line, separated by a colon ":", as shown in FIG. 6. Comments could follow using double forward slashes as in C++. In this example, scalar processor is acting as the I/O processor loading the vector registers, and vector unit is performing vector-multiply (VMUL) and vector-multiply-accumulate (VMAC) operations. These vector operations are performed on 16 input element pairs, where each element is 16-bits.

If a line of assembly code does not contain a scalar and vector instruction pair, the assembler will infer a NOP for the missing instruction. This NOP could be explicitly written or simply omitted.

In general, RISC processor has the simple RISC instruction set plus vector load and store instructions, except multiply instructions. Both RISC and SIMD has register-to-register model, i.e., operate only on data in registers. In the preferred embodiment RISC has the standard 32 16-bit data registers. SIMD vector processor has its own set of vector register, but depends on the RISC processor to load and store these registers between the data memory and vector register file.

Some of the other SIMD processors have multiple modes of operation, where vector registers could be treated as byte, 16-bit, or 32-bit elements. The present invention uses only 16-bit to reduce the number of modes of operation in order to simplify chip design. The other reason is that byte and 32-bit data resolution is not useful for video processing. The only exception is motion estimation, which uses 8-bit pixel values. Even though pixel values are inherently 8-bits, the video processing pipeline has to be 16-bits of resolution, because of promotion of data resolution during processing. The SIMD of present invention use a 48-bit accumulator for accumulation, because multiplication of two 16-bit numbers produces a 32-bit number, which has to be accumulated for various operations such as FIR filters. Using 16-bits of interim resolution between pipeline stages of video processing, and 48-bit accumulation within a stage produces high quality video results, as opposed to using 12-bits and smaller accumulators.

Figure 7:
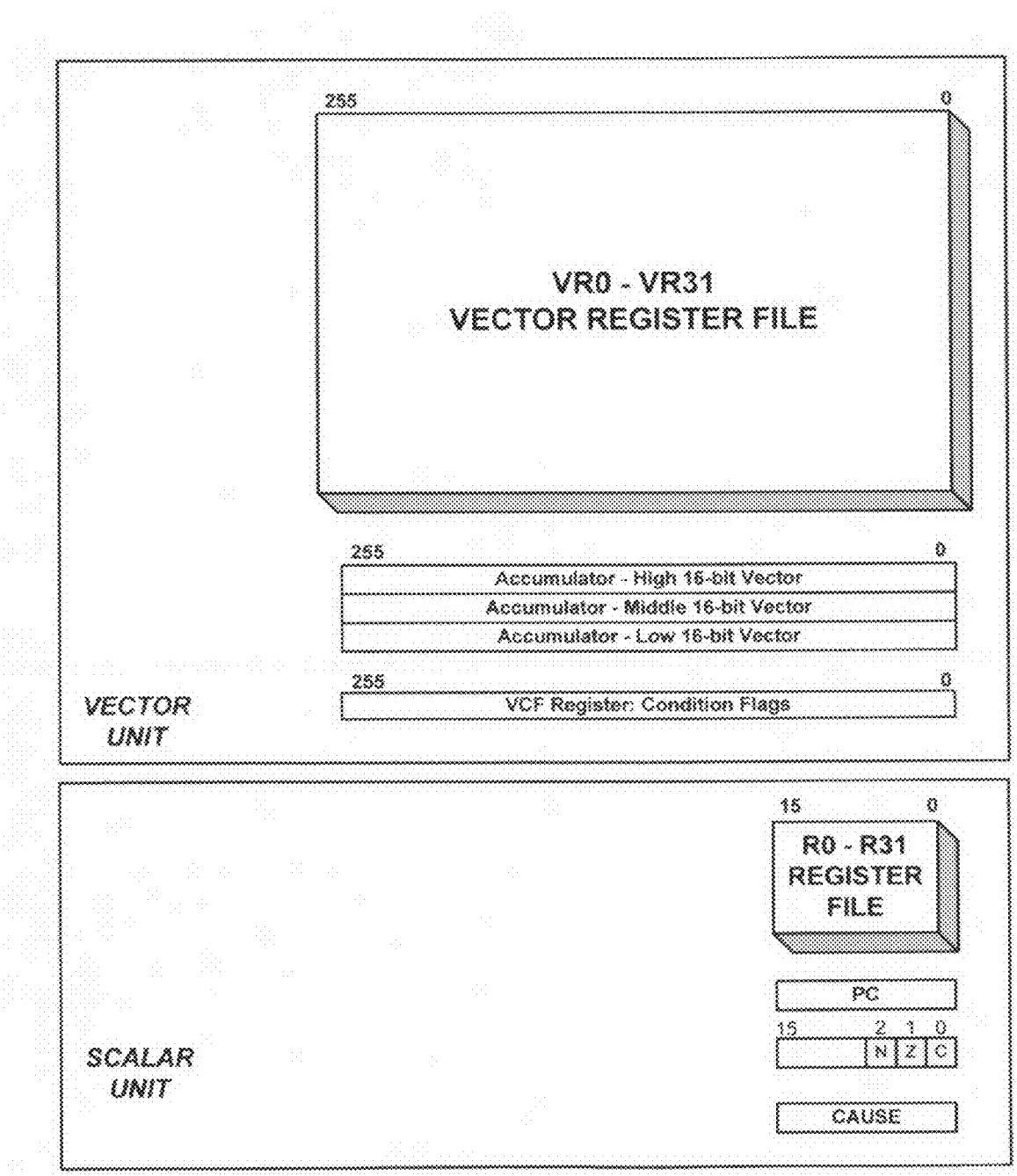
FIG. 7 shows the programming model of combined RISC and SIMD processors.

The programmers' model is shown in FIG. 7. All basic RISC programmers' model registers are included, which includes thirty-two 16-bit registers. The vector unit model has 32 vector register, vector accumulator registers and vector condition code register, as the following will describe. The vector registers, VR31-VR0, form the 32 256-bit wide register file as the primary workhorse of data crunching. These registers contain 16 16-bit elements. These registers can be used as source and destination of vector operations. In parallel with vector operations, these registers could be loaded or stored from/to data memory by the scalar unit.

The vector accumulator registers are shown in three parts: high, middle, and low 16-bits for each element. These three portions make up the 48-bit accumulator register corresponding to each element position.

There are sixteen condition code flags for each vector element of vector condition flag (VCF) register. Two of these are permanently wired as true and false. The other 14 condition flags are set by the vector compare instruction (VCMP), or loaded by LDVCR scalar instruction, and stored by STVCR scalar instruction. All vector instructions are conditional in nature and use these flags.

FIG. 8 shows an example of the vector load and store instructions that are part of the scalar processor in the preferred embodiment, but also could be performed by the SIMD processor in a different embodiment. Performing these by the scalar processor provides the ability to load and store vector operations in parallel with vector data processing operations, and thus increases performance by essentially "hiding" the vector input/output behind the vector operations. Vector load and store can load the all the elements of a vector register, or perform only partial loads such as loading of 1, 2, 4, or 8 elements starting with a given element number (LDV.M and STV.M instructions).

FIG. 9 shows an example of the vector arithmetic instructions. All arithmetic instructions results are stored into vector accumulator. If the mask bit is set, or if the condition flag chosen for a given vector element position is not true, then vector accumulator is not clamped and written into selected vector destination register. FIG. 10 shows an example list of vector accumulator instructions.

FIG. 11 shows the DCT arithmetic that is necessary using implementation of 8-length DCT calculation. Direct implementation of this matrix multiplication without the use of any fast DCT algorithms would require 8 clock cycles. Such a matrix multiplication would be done by calculating the matrix multiplication in eight steps. In the first step, first column of matrix T is multiplied with respective vector elements of X using VMUL. During the next 7 steps, columns 2 through 8 of matrix T is vector-multiply-accumulated with X vector using VMAC instruction. Using 8 instructions provides an upper bound for 1-D 8-length DCT or IDCT calculations. It is assumed that all vector multiply and store operations are performed in parallel by the scalar unit without any additional overhead or cycles.

Fast DCT algorithms provide improved performance by reducing the number of cycles necessary for 1-D 8-length DCT or IDCT calculations. Using preferred embodiment of 16-wide SIMD, one such fast DCT algorithm implementation is shown in FIG. 12. DCT is calculated in five stages. In each stage, two different 8-wide iDCT is calculated, which is shown as 600 and 610, and 620 and 630. The data x could initially contain two rows of 8×8 input data, or two adjacent rows of two 8×8 input data, but probably calculating two rows concurrently would make it easier by processing on a 8×8 block basis. The first four stages uses default multiply operation for all vector element positions, and the stage five uses add or subtract depending on the vector element position feature of present invention in accordance with the control vector register. Sometimes rounding is performed after the fifth stage, which would add one more vector instruction. Thus, it would take 6 vector instructions for calculating two 8-length iDCTs, or 3 vector instructions per 8-length iDCT.

Figure 13:
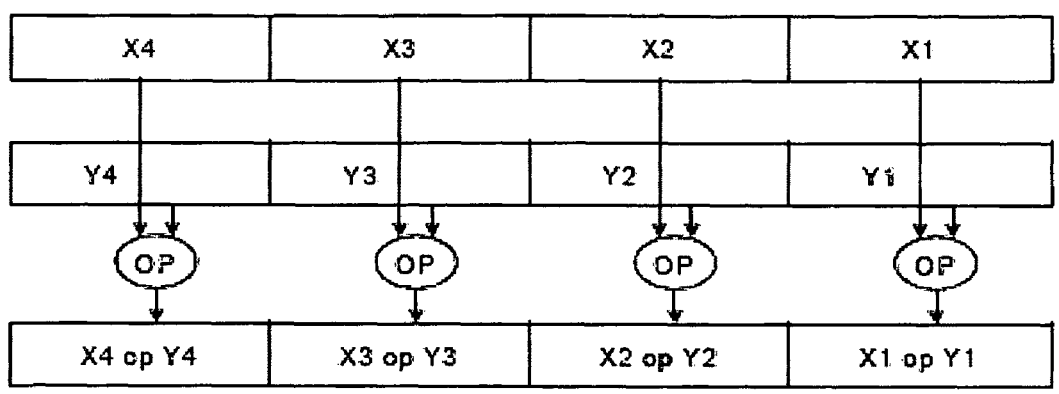
FIG. 13 shows prior art 4-wide SIMD operation in Intel MMX and SSE architectures.

The present invention provides ability to pair elements of two source vector in any user-defined mapping. In addition, the ability to perform different vector operations for each vector element position provides the ability to combine the mixed calculation of vector add and subtract operations. Also, using a wide vector accumulator provides use of narrow vector elements (16-bits), which results in more parallelism because 256-bit wide SIMD of present invention equals 16-wide SIMD. Also, dual-issue of SIMD plus vector load and store operations reduces the overhead due to vector input/output. In contrast, prior art SIMD of Intel MMX/SSE shown in FIG. 13 provides only 4-wide parallelism, no way to map vector elements for pairing, only same operation for all vector elements, and no dual-issue to hide vector input/output.

8×8 DCT is separable to processing of 8 rows, followed by 8 columns of 8-length DCT or iDCTs. One approach is to first perform DCT/iDCT of 8 rows first. Then, transposing rows and columns, and then performing DCT/IDCT of 8-rows again, followed by another row-to-column transpose operation. However, such transpose operations consume a lot of processor cycles. Even using the mapping advantages of present invention each transpose operation requires 8 instructions or cycles. Performing 8 rows of DCT/iDCT would require 8*3, or 24 cycles. Thus, two transpose operations require 16 clock cycles which is close to DCT operation of all rows. Therefore, the present invention uses different methods for rows and columns. Rows are DCT transformed in parallel by looking at all row elements (actually two rows at the same time). Columns are DCT transformed in place using one operation for each column as if we have a scalar processor performing DCTs, but using the SIMD parallelism to perform 8 columns at the same time, and since preferred embodiment has 16-processing elements we could calculated two vertical points of each column at the same time.

Figure 14:
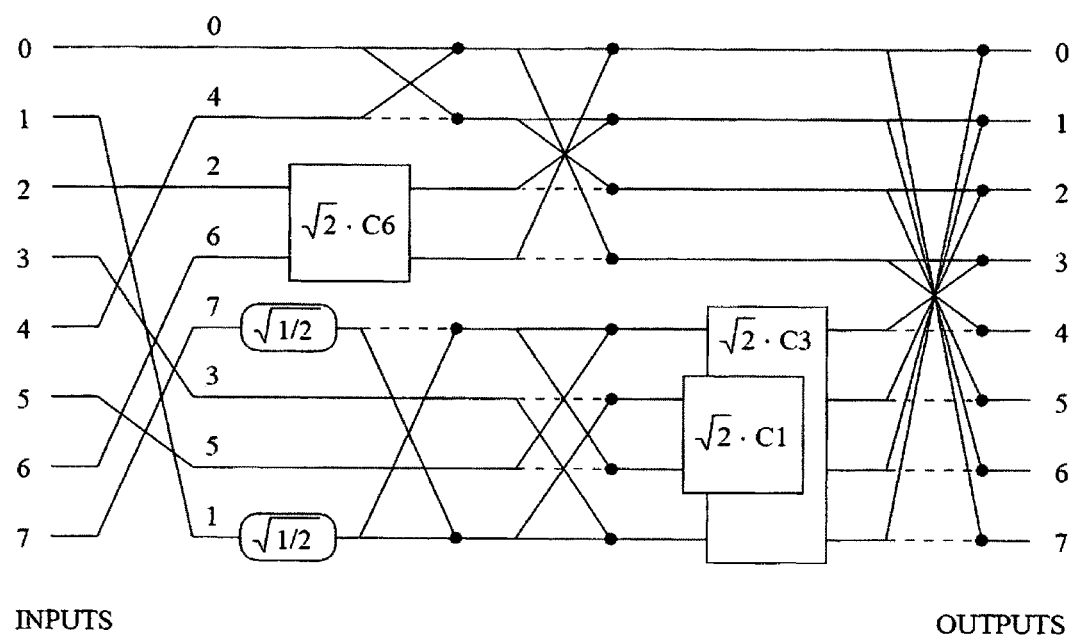
FIG. 14 shows diagram of modified "Leoffler" algorithm.
Figure 16:
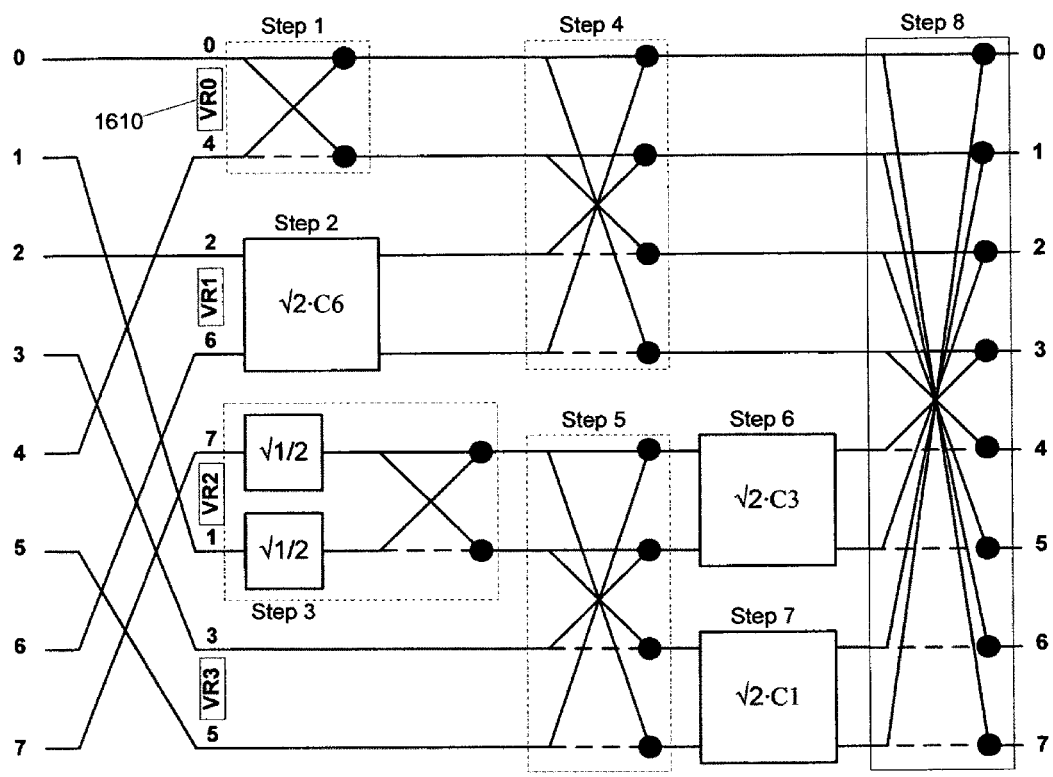
FIG. 16 shows diagram of "Leoffler" algorithm adapted and modified for present invention for performing 1-D inverse DCT on columns.

FIG. 14 shows data flow of modified "Leoffler" DCT algorithm. Arranging it to make input data more accessible by vector operators, we have Leoffler changed as shown in FIG. 15. Each adjacent two horizontal lines are stored in a single vector register. For example, input lines 0 and 4 are stored in VR0 as shown at 1501, and similarly input lines 2 and 6 are stored in vector register VR1. Since each vector operation instruction has two source vector operands, such an arrangement of data provides access to 4-lines of the DCT. For example, in step 4 all data are accessible by one vector instruction. FIG. 16 shows the arrangement of data before the vector operations. FIG. 15 shows the steps of operation. Step 1 calculates the "butterfly" of DCT. This step would calculate two vertical partial results, but for all 8 columns of 8×8 DCT/iDCT in parallel. Step 1 requires one vector instruction using VADD instruction and bit #10 to change certain elements to subtraction. Step 2 requires vector multiplication using VMUL first, followed by VMAC where certain elements are changed to subtraction from vector-accumulator using bit #11 of vector control register. Thus, we have:

Step 1: 1 cycle;
Step 2: 2 cycles;
Step 3: 2 cycles;
Step 4: 2 cycles;
Step 5: 2 cycles;
Step 6: 2 cycles;
Step 7: 2 cycles;
Step 8: 8 cycles In step 8, VR0 and VR3 are used as input operands to provide access to all elements of outside butterflies, and VR1 and VR2 are similarly paired to provide access to elements of two central row inputs. The total number of cycles for performing column transforms in place for all 8 columns concurrently is 21 cycles. Therefore to perform both row and column transforms without any transpose required would take 24 plus 21, or 41 cycles for 16-wide embodiment of present invention. This represents significant improvement over both dedicated hardware and existing SIMD methods to perform 8×8 DCT operations.

The following shows the operations necessary for performing 4×4 integer DCT for H.264 video compression and decompression standard:

Step 1:
$ei0 = di0 + di2$, with $i=0 \ldots 3$
$ei1 = di0 - di2$, with $i=0 \ldots 3$
$ei2 = (di1 >> 1) - di3$, with $i=0 \ldots 3$
$ei3 = di1 + (di3 >> 1)$, with $i=0 \ldots 3$
Then, the transformed result is computed from these intermediate values as follows.

Step 2:
$fi0 = ei0 + ei3$, with $i=0 \ldots 3$
$fi1 = ei1 + ei2$, with $i=0 \ldots 3$
$fi2 = ei1 - ei2$, with $i=0 \ldots 3$
$fi3 = ei0 - ei3$, with $i=0 \ldots 3$
Then, each (vertical) column of the resulting matrix is transformed using the same one-dimensional inverse transform as follows. A set of intermediate values is computed as follows.

Step 3:
$g0j = f0j + f2j$, with $j=0 \ldots 3$
$g1j = f0j - f2j$, with $j=0 \ldots 3$
$g2j = (f1j >> 1) - f3j$, with $j=0 \ldots 3$
$g3j = f1j + (f3j >> 1)$, with $j=0 \ldots 3$
Then, the transformed result is computed from these intermediate values as follows.

Step 4:
$h0j = g0j + g3j$, with $j=0 \ldots 3$
$h1j = g1j + g2j$, with $j=0 \ldots 3$
$h2j = g1j - g2j$, with $j=0 \ldots 3$
$h3j = g0j - g3j$, with $j=0 \ldots 3$ In this case, the input data of dij is stored in vector register VR0 in the format shown in FIG. 18. Each step would require 4 vector VADD instructions. The shift-downs are incorporated using shift down of source 1 or source 2 using bits 12 and 13 of vector control register without requiring additional cycles. The total number of cycles for four steps is 4 cycles.

The details of vector mapping and vector operations are shown in FIG. 19. Certain vector operations are changed to subtract using bit #10 of vector control register (shown as SUB under OP column).

The corresponding structures, materials, acts, and equivalents of all means or step plus function elements in the claims below are intended to include any structure, material, or acts for performing the functions in combination with other claimed elements as specifically claimed.

I claim:

1. An apparatus for efficient and parallel implementation of digital signal processing algorithms in a single-instruction multiple-data (SIMD) processor, the apparatus comprising:
   a vector register file for containing vector registers, wherein each vector register holds a plurality of vector elements of a predetermined size, said vector register file storing a first source vector, a second source vector, and a control vector;
   a vector operation unit including a plurality of computing elements for performing a plurality of arithmetic/logical operations in parallel, each of said plurality of computing elements having a first input and a second input;
   a first select logic for each vector element position coupled to respective said first input for selecting from a first list including but not limited to elements of said first source vector in accordance with said control vector;
   a second select logic for each vector element position coupled to respective said second input for selecting from a second list including but not limited to elements of said second source vector in accordance with said control vector;
   wherein said first list further includes elements of said second source vector and wherein said second list further includes elements of said first source vector; and
   wherein each vector element stores a fixed-point or a floating-point number.

2. The apparatus according to claim 1, wherein each input of vector operator can be pre-scaled by a predetermined amount before the operation in accordance with respective vector element of said control vector.

3. The apparatus according to claim 1, wherein sign of each input of vector operator can be changed before the operation in accordance with respective vector element of said control vector.

4. The apparatus according to claim 1, wherein an input of vector operator can be overridden to be zero accordance with respective vector element of said control vector.

5. The apparatus according to claim 1, further including a vector accumulator coupled to output of said vector operation unit for accumulation of partial results in accordance with a vector instruction.

6. The apparatus according to claim 1, further including a vector mask unit coupled to a write port of said vector register file for controlling storing of output to said vector register file on an element-by-element basis in accordance with a respective mask bit of said control vector.

7. The apparatus according to claim 5, further including a vector clamping unit coupled to output of said vector accumulator for performing saturated arithmetic before storing result in a vector destination register of said vector register file.

8. The apparatus according to claim 1, wherein three vector instruction formats are supported, in accordance with a format field of instruction word, in pairing elements of said first source vector and second source vector: respective elementto-element format as default, one-element broadcast format, and any-element-to-any-element format requiring a third source vector operand.

9. The apparatus according to claim 1, further comprising means for performing inverse 4×4 DCT, whereby an integer 4×4 inverse DCT is performed in parallel according MPEG standard.

10. The apparatus according to claim 1, further comprising means for performing one or more inverse 8-length DCT operations in parallel according to MPEG standard.

11. The apparatus according to claim 1, further comprising means for calculating inverse 8×8 DCT in parallel according to MPEG standard.

12. The apparatus according to claim 1, wherein number of vector elements for each vector register is an integer between 2 and 1025.

13. The apparatus according to claim 1, wherein each vector element size is one of 16-bits, 32-bits, and 64-bits.

* * * * *